US008477661B2

(12) United States Patent
Saleem et al.

(10) Patent No.: US 8,477,661 B2
(45) Date of Patent: Jul. 2, 2013

(54) DISTRIBUTED MEDIA MIXING AND CONFERENCING IN IP NETWORKS

(75) Inventors: Adnan Saleem, Surrey (CA); Neil M. Gunn, Coquitlam (CA); Timothy S. Woinoski, Coquitlam (CA); Yong Xin, Coquitlam (CA)

(73) Assignee: RadiSys Canada ULC, Burnaby (CA)

( * ) Notice: Subject to any disclaimer, the term of this patent is extended or adjusted under 35 U.S.C. 154(b) by 992 days.

(21) Appl. No.: 12/541,738

(22) Filed: Aug. 14, 2009

(65) Prior Publication Data

US 2011/0038281 A1    Feb. 17, 2011

(51) Int. Cl.
*H04L 12/16*    (2006.01)
(52) U.S. Cl.
USPC .................... 370/260; 348/14.09; 379/202.01
(58) Field of Classification Search
USPC ...................... 370/260–262; 348/14.08–14.1; 379/202.01–206.01
See application file for complete search history.

(56) References Cited

U.S. PATENT DOCUMENTS

| | | | |
|---|---|---|---|
| 2003/0145054 A1* | 7/2003 | Dyke | 709/205 |
| 2003/0235184 A1 | 12/2003 | Dorenbosch et al. | |
| 2007/0213078 A1* | 9/2007 | Shaheen | 455/466 |
| 2007/0294346 A1* | 12/2007 | Moore et al. | 709/204 |
| 2009/0309956 A1* | 12/2009 | Hawkins et al. | 348/14.08 |
| 2011/0018960 A1* | 1/2011 | Eshkoli et al. | 348/14.09 |

OTHER PUBLICATIONS

Cho, Y H et al., "Policy-Based Distributed Management Architecture for Large-Scale Enterprise Conferencing Service Using SIP," IEEE Journal on Selected Areas in Communications, vol. 23, No. 10, Oct. 2005, p. 1934-1949.
Rosenberg J., "A Framework for Conferencing with the Session Initiation Protocol; draft-ietf-sipping-conferencing-framework-03," Internet Draft, Internet Engineering Task Force, Oct. 2004.
Kundan, Singh et al., "Centralized Conferencing Using SIP," Proceedings of the 2nd IP-Telephony Workshop, Apr. 2001.
Prasad, R V et al., "A scalable Distributed VoIP Conferencing Using SIP," Proceedings of the Eighth IEEE International Symposium on Computer and Communication (ISCC'03), 1530-1346/03, 2003.
Saleem, A et al., "Media Server Markup Language (MSML); draft-saleem-msml-09," Internet Draft, Internet Engineering Task Force, Jul. 2009.

* cited by examiner

*Primary Examiner* — Dang Ton
*Assistant Examiner* — Mandish Randhawa
(74) *Attorney, Agent, or Firm* — Stoel Rives LLP (57) ABSTRACT

Systems and methods are provided for a distributed conferencing service through an internet protocol (IP) network. A plurality of tributary mixers are configured communicate with a master mixer or a plurality of master mixers, at least one of which communicates through the IP network. Each tributary mixer is configured to join one or more respective participants to the distributed conference, generate a first mixed media stream by mixing a plurality of ingress media streams from the respective participants, and receive a second mixed media stream from the master mixer. The second mixed media stream includes media from at least one other participant joined to the distributed conference through another of the tributary mixers. Each tributary mixer also provides egress media streams to its respective participants based on a control signal from the master mixer.

22 Claims, 9 Drawing Sheets

DISTRIBUTED MEDIA MIXING AND CONFERENCING IN IP NETWORKS

TECHNICAL FIELD

This disclosure relates to multimedia communications. In particular, this disclosure relates to multimedia conferencing in IP (Internet Protocol) networks using distributed media processing and mixing nodes.

BACKGROUND INFORMATION

IP based conference servers are typically referred to as IP media servers which are employed in telephony networks. IP media servers perform a variety of basic and enhanced services which include conferencing, audio and video interactive voice response (IVR), transcoding, audio and video announcements, and other advanced speech services. IP media servers may also be employed in networks which provide video conferencing services, as well as typical data exchange services of the sort which occurs over the Internet, over virtual private networks, within wide area networks and local area networks, and the like. Data exchange and processing performed by the media server is based on packet processing with fixed maximum processing time requirements.

IP multimedia conferencing servers allow a number of participants to join a conference. A conference service generally requires the mixing of participants' media by a mixer resource, allowing all participants to hear and/or see other participants as they become active during the conference. The conference mixer resource generally requires media from all participants to determine which participants will be heard or seen during conference operation as active participants. The set of active participants can dynamically change in real-time as a given participant stops contributing while another participant starts contributing.

SUMMARY OF THE DISCLOSURE

In one embodiment, a system provides a distributed conferencing service through IP network. The system includes a master mixer configured to provide distributed mixing of media streams associated with a distributed conference held through the IP network, and a plurality of tributary mixers configured to communicate with the master mixer. At least one of the tributary mixers is configured to communicate with the master mixer through the IP network.

Each tributary mixer is configured to join one or more respective participants to the distributed conference, generate a first mixed media stream by mixing a plurality of ingress media streams from the respective participants, and receive a second mixed media stream from the master mixer. The second mixed media stream includes media from at least one other participant joined to the distributed conference through another of the tributary mixers.

Each tributary mixer is also configured to provide egress media streams to its respective participants. Each egress media stream includes the second mixed media stream. Each egress media stream selectively includes, based on a determination by the master mixer that the first mixed media stream is included in the distributed conference, at least a portion of the first mixed media stream.

Additional aspects and advantages will be apparent from the following detailed description of preferred embodiments, which proceeds with reference to the accompanying drawings.

BRIEF DESCRIPTION OF THE DRAWINGS

Non-limiting and non-exhaustive embodiments of the disclosure will now be described in more detail, by way of example only, with reference to the accompanying drawings, in which.

DETAILED DESCRIPTION OF PREFERRED EMBODIMENTS

Collaboration applications, such as audio and multimedia conferencing, typically include geographically dispersed participants. In audio conferencing systems, the audio streams of all participants are transmitted to and from a central mixer or bridge. In certain embodiments disclosed herein, however, systems and methods are provided for a mixer or conference bridge to be logically and physically distributed such that all participant media streams do not need to be sent over long distance communications links to a single central mixer or conference bridge. Additionally, the disclosed embodiments enable large conferencing applications to be built using a distributed approach where a single media processing node does not impose limitations on the size of the conference.

A single instance of a conferencing service may be distributed over J processors, where J>=1. A set of media processing servers may be collocated within the same physical server or may be distributed over a number of physical servers interconnected via IP communications interfaces over near or far locations.

Regardless of the conference mixer resources being collocated or distributed, it is generally desired that the user experience of the services and participant interaction in the conference not be altered. For instance, in an audio conference, all participants, regardless of the conference mixer resources being geographically distributed or collocated, should hear the same conference output mix.

The distributed or aggregate conference, which may include several mixers (co-located or geographically disperse), is controlled by a common entity in the IP communications network, namely the application server. The application server creates each instance of a mixer within the distributed conference, joins and manages participants to each mixer, and joins the mixers to a master mixer to create topology and connectivity required for a distributed conference. The application server creates and controls each mixer that is part of a distributed conference using control protocol and interface. One example control interface is the Session Initiation Protocol (IETF RFC 3261) with XML encoded messaging payloads.

In certain embodiments, media processing and mixing operations are associated with the same conference instance, to be performed by a physically distributed set of media mixers, while preserving a consistent user experience for all participants, whether local or remote.

In one embodiment, an IP conferencing media server for processing media packets includes a single master mixer resource or multiple master mixers, interconnected over IP links with one or more local mixer resource(s) and one or more remote mixer resource(s). Multiple master mixer resources, one per geographical cluster, are utilized to minimize the delays between geographically local tributary mixers without incurring delays to the geographically remote master mixer.

In one embodiment, a method is provided for automatic media controls between the master mixer and the local mixers and between the master mixer and remote mixers. While the local and remote mixers are operating independently to mix the audio/multimedia streams from their respective participants, the master mixer controls the audio/multimedia content sent to all participants, overriding, whenever necessary, the media output generated by the local and remote mixers. The media control enables consistent audio and multimedia content, across all conference participants, to be received by all local and remote participants.

The disclosed embodiments additionally enable the aggregation of several physically or logically separate and distinct media processing and mixing nodes, to create a large conference whereas the capability of each individual node would have prevented the creation of a large conference. The design solution captured in the embodiments enables scalability of conference media mixing, without incurring unacceptable media delays and preserving the consistency of operation of a distributed conference.

By way of a simple example, a conference service may be established using a master mixer in communication with five geographically distributed tributary mixers A, B, C, D, and E. Each of the tributary mixers A, B, C, D, and E may be configured to join a plurality of participants (e.g., anywhere from one to 1000 participants, or more) to the conference. Each of the tributary mixers A, B, C, D, and E may be configured to mix N (e.g., two to four) loudest media inputs that it receives from its respective participants. Each tributary mixer then provides its mixed media stream to the master mixer. Thus, in this example, the master mixer receives five mixed media streams. The master mixer may be configured to select N (e.g., two) of the loudest mixed media streams that it receives for inclusion in the conference.

Continuing the above example, suppose the master mixer selected the streams from tributary mixers A and B for inclusion in the conference. For the three tributary mixers C, D, and E that provided mixed media streams which were not selected by the master mixer, the master mixer provides its mixed media stream (a mix of the two selected streams) along with an override signal to indicate that these three tributary mixers C, D, and E are not to provide their own mixed media signals to their respective participants. In other words, tributary mixers C, D, and E only provide their respective participants with the mix of media streams originally provided by tributary mixers A and B. For the two tributary mixers A and B that provided mixed media streams selected by the master mixer, the master mixer provides the mixed media stream of the other selected tributary mixer. For example, the master mixer sends the mixed media stream generated by tributary mixer A to tributary mixer B, which tributary mixer B mixes with its own mixed media stream and provides to its respective participants. Similarly, the master mixer sends the mixed media stream generated by tributary mixer B to tributary mixer A, which tributary mixer A mixes with its own mixed media stream and provides to its respective participants.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or detailed description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

Figure 1:
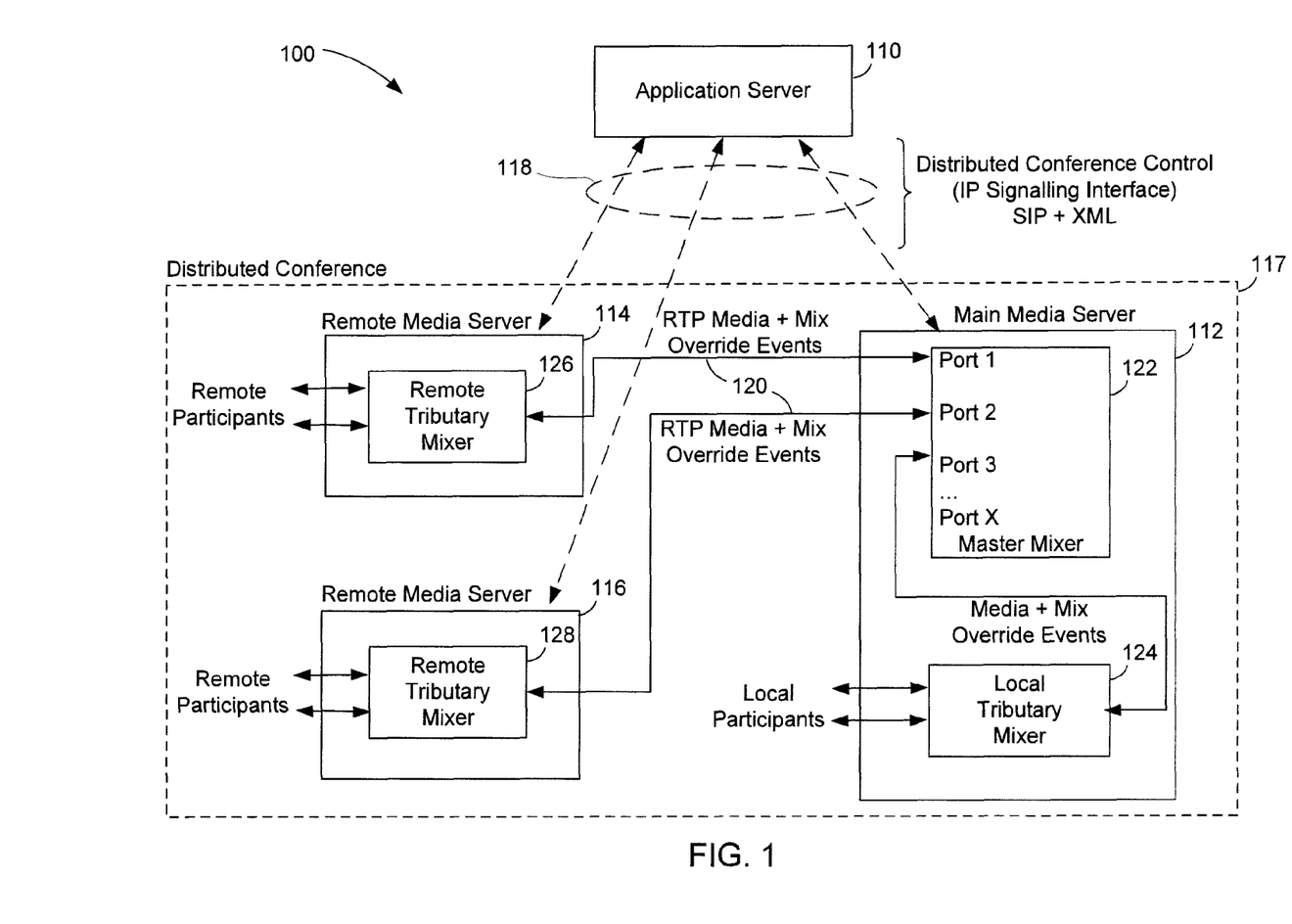
FIG. 1 is a block diagram of a system for distributed media mixing and conferencing in an IP network according to one embodiment.

FIG. 1 is a block diagram of a system 100 for distributed media mixing and conferencing in an IP network according to one embodiment. The system 100 includes a conferencing application server 110 and a set of IP media servers 112, 114, 116. In this example embodiment, a local or "main" media server 112 communicates with two remote media servers 114, 116 in a distributed conference 117. An artisan will understand from this disclosure, however, that any number of media servers may be used. To create a distributed conference, the system 100 uses control interfaces 118 between the application server 110 and the media servers 112, 114, 116, as well as media interfaces 120 between the main media server 112 and the remote media servers 114, 116. In this example, one or more local users of the system 100 join a conference through the main media server 112 as local participants, and one or more remote users join the conference through the remote media servers 114, 116 as remote users.

As illustrated in FIG. 1, the main media server 112 includes a master mixer 122 and a local tributary mixer 124. The remote media servers 114, 116 each include a respective remote tributary mixer 126, 128. The remote and local tributary mixers 124, 126, 128 provide access to participants of a given conference service. The master mixer 122 provides a media bridge and mixing of the media generated by the local tributary mixer 124 and the remote tributary mixers 126, 128.

In one embodiment, the master mixer 122 joins the media paths from the remote tributary mixers 126, 128 in a star topology.

The master mixer 122, the local tributary mixer 124, and the remote tributary mixers 126, 128 provide a common underlying media processing function which allows N media streams to be selected from a total M media streams, where N<=M. The selection of N media streams, as described in the example embodiments herein is based on the N loudest audio streams, which are then mixed into a single audio stream, although not limited to this particular selection criteria and embodiment. Selection of other media types, such as multimedia or video, is determined by the controlling attributes for video switching, continuous presence, or other selection criteria and multimedia mixing embodiments.

A problem common with cascading or distributed conferences is the large amount of background noise mixed in the conference output when the loudest speakers from the tributary conferences are mixed. The design approach solving this issue relies on individually settable N active or loudest speakers for the master mixer 122, the local tributary mixer 124, and the remote tributary mixers 126, 128. The individual tuning of the number of active participants to be mixed in the final conference mix allows various conference deployment scenarios to be optimized by the external application server 110, which can control the behavior of the various mixer types created on the media servers 112, 114, 116.

In distributed conferences, large media delays are typically incurred due to the need to aggregate media at the remote tributaries as well as a central mixer which mixes the media provided by the tributaries. Excessive delays in media processing due to the distributed nature of these conferences significantly degrades the user experience and in extreme cases may prevent any practical use of distributed conferences. Thus, delay minimization is an additional aspect of certain embodiments disclosed herein, where the master mixer 122 is able to feed mixed media back to the tributary mixers 124, 126, 128 along with an embedded control signal to indicate whether the participants in the tributary mixers 124, 126, 128 should mix their local media with the media provided by the master mixer 122. Embedding this control information in the media path minimizes the delay in making the mix override decision.

As each tributary mixer 124, 126, 128 is providing a local media mix for participants joined to it, these participants may not receive the media being received by participants in another tributary mixer. When all participants in the distributed conference do not receive the same media, the fundamental operation of a conference may be considered to be flawed. The design approach according to certain embodiments disclosed herein solves this issue by ensuring that all participants, regardless of which tributary mixer 124, 126, 128 they are joined to, receive the same media, keeping the conference media consistent across all participants.

Each instance of a mixer (master 122, local tributary 124, remote tributary 126, 128) reports an independent list of active speakers in the form of an asynchronous event to the application server 110. The ASN (active speaker notification) event is XML (extensive markup language) encoded, identifying the source mixer and a list of participants currently deemed as active speakers. The ASN events are reported to the application server 110 over a signaling control interface, for example SIP (session initiation protocol) with XML encoded payloads containing the ASN event.

Aggregation and consolidation of ASN events reported by several mixers (e.g., one or more of mixers 124, 126, 128), all part of a distributed conference, are processed by the application server 110 which in turn presents a single unified list of active speakers for the overall distributed conference as a single unified service.

Example embodiments of a distributed conferencing system are disclosed herein below.

Application Server Control of Distributed Conferences

FIG. 1 shows an example distributed conference under the control of the application server 110 which creates the master mixer 122 and tributary mixers 124, 126, 128 across multiple media servers 112, 114, 116, joins the media streams between these mixers, and joins participants to individual mixers. The application server 110 according to one embodiment may configure any of the media servers 112, 114, 116 during run time to serve as a master mixer, a local tributary mixer, a remote tributary mixer, or any combination of the above within the same physical media server to host multiple distributed conferences.

The application server 110 controls the media servers 112, 114, 116 via signaling control protocol. A typical signaling control interface, for example, is the session initiation protocol (SIP) and XML encoded message carried over the SIP interface to the media servers 112, 114, 116.

The following example code blocks include sample use cases that describe an example embodiment used over the interface 118 to create and control the master mixer 122 and tributary mixers 124 and join participants to them. In the following example code blocks, XML encoded messages, represented as pseudocode in this embodiment, are sent by the application server 110 to the media servers 112, 114, 116, to describe the general embodiment. However, the exact semantics may be instantiated differently, including using different protocols or programming languages, to accomplish the same result.

Create Master and Local Tributary Mixer.

```
<!--Instructions to Main Media Server -->
<xml>
<createconference name="main">
    <audiomix cascade="main">
        <asn/>
        <n-loudest n="1"/>
    </audiomix>
</createconference>
<createconference name="localTrib">
    <audiomix cascade="tributary">
        <asn/>
        <n-loudest n="1"/>
    </audiomix>
</createconference>
</xml>
```

Create Remote Tributary Mixer

```
<!-- Instructions to Remote Media Servers -->
<xml>
<createconference name="remoteTrib">
    <audiomix cascade="tributary">
        <asn/>
        <n-loudest n="1"/>
    </audiomix>
</createconference>
</xml>
```

Connect Local Tributary Mixer to the Master Mixer

```
<!-- Instructions to Main Media Server -->
<xml>
    <join id1="conf:localTrib" id2="conf:main">
    </join>
</xml>
```

Join Remote Tributary Mixer to Master Mixer

```
<!-- Instructions to Main Media Server -->
<xml>
<join id1="conn:P1" id2="conf:main">
    <stream media="audio"/>
</join>
</xml>
<!-- Instructions to Remote Media Servers -->
<xml>
<join id1="conn:P2" id2="conf:remoteTrib">
    <stream media="audio" cascade="true"/>
</join>
</xml>
```

Note that for this example code, media connections P1 and P2 are created by the application server on the main media server (P1) and remote media server (P2) to be used as inter-conference media connections between the main and remote tributary conferences.

Join Participants Media To Local Tributary and Remote Tributary Mixers

```
<!--Instructions to Main Media Server -->
<xml>
    <join id1="conn:localUser" id2="conf:localTrib"/>
</xml>
<!-- On MS A and B -->
<xml>
    <join id1="conn:remoteUser" id2="conf:remoteTrib"/>
</xml>
```

Active Speaker Notifications Sent by Media Servers to Application Server

```
<!-- Active Speaker Message generated by Main Mixer -->
<!-- Following Example when Local Tributary in the Main Mixer -->
<xml>
<event name="xml.conf.asn" id="conf:main"/>
<name>speaker</name>
<value>conf:localTrib</value>
</xml>
<!-- Active Speaker Message generated by Main Mixer -->
<!-- Following Example when Remote Tributary in the Main Mixer -->
<xml>
<event name="xml.conf.asn" id="conf:main"/>
<name>speaker</name>
<value>conn:P1 </value>
</xml>
<!-- Active Speaker Message generated by Local Tributary Mixer -->
<!-- from local tributary conference -->
<xml>
<event name="xml.conf.asn" id="conf:localTrib"/>
<name>speaker</name>
<value>conn:localUser</value>
</xml>
<!-- Active Speaker Message generated by Remote Tributary Mixer -->
<!-- from remote tributary conference -->
<xml>
```

-continued

```
<event name="xml.conf.asn" id="conf:remoteTrib"/>
<name>speaker</name>
<value>conn:remoteUser</value>
</xml>
```

The distributed embodiment described in these example code blocks provides the ability for the application server 110 to individually control the value of N for each of the mixers associated with the distributed conference, including the master mixer 112, the local tributary mixer 124, and the remote tributary mixers 128, 128.

Mixer Controls and Operation

Figure 2:
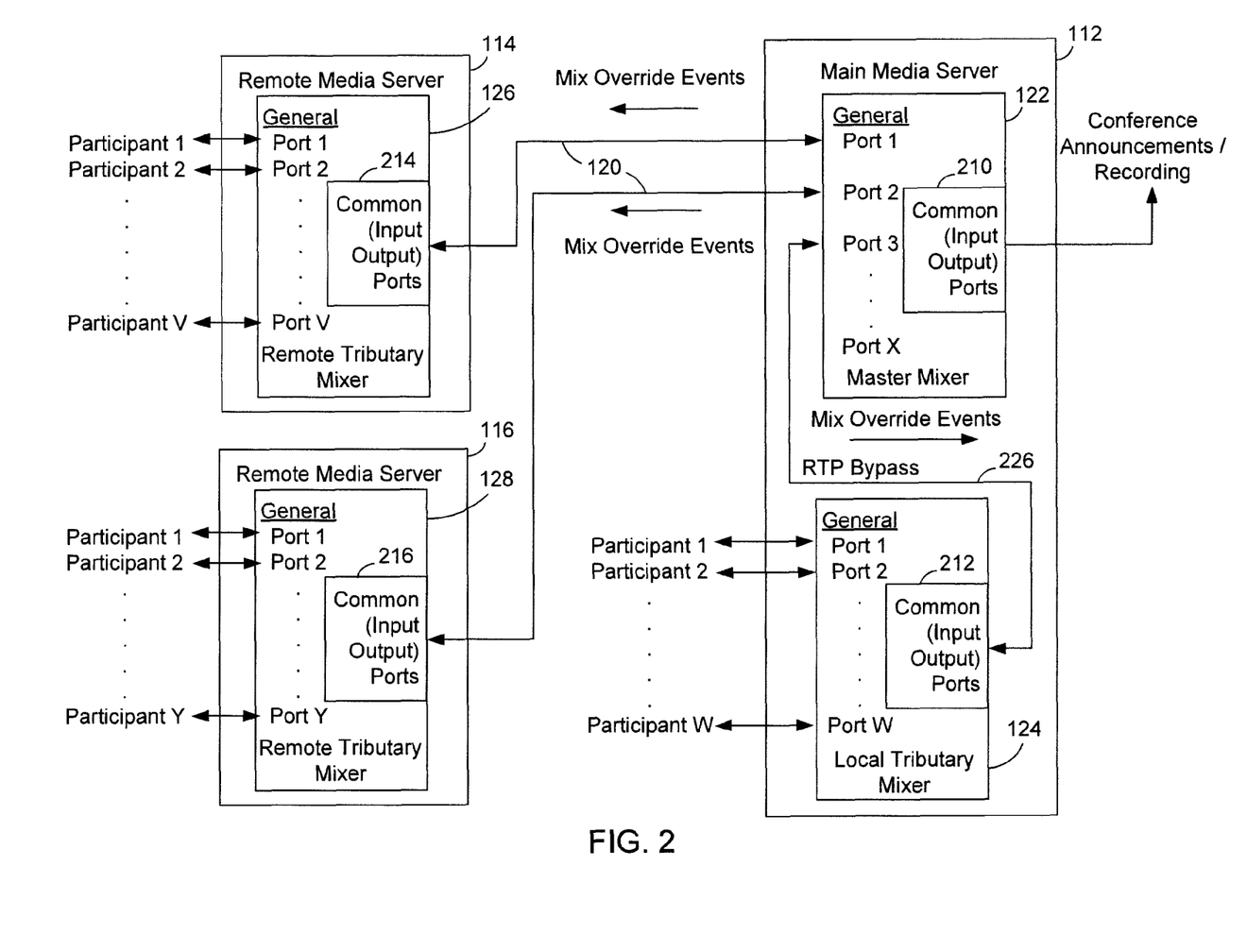
FIG. 2 is a block diagram illustrating the connectivity of several media servers and their respective roles in creating a distributed conference according to one embodiment.

Each media mixer 122, 124, 126, 128, for audio conferencing, includes the functionality to mix M participant input media lines (represented as a set ranging from M1 to Mq) by selecting N loudest input lines and mixing them into mixed media represented by Nx, where N<=M. The particular value of N may be the same or different for each media mixer 122, 124, 126, 128. In certain embodiments, the value of N for each media mixer 122, 124, 126, 128 is selected by the application server 110. Each individual participant media output line receives or hears (in addition the input received through its respective common port 210, 212, 214, 216) the Nx (the complete mix of the selected or loudest N lines for a particular mixer) if the individual participant media input was not selected to be included in Nx. However, if the participant's media input was selected as one of N loudest speakers, then the media output to the given participant (in addition the input received through its respective common port 210, 212, 214, 216) includes Nx-Mk, where Mk represents the media input from the participant. Thus, participants do not hear their own audio regardless of whether their audio input was selected to become part of the conference mix.

FIG. 2 is a block diagram illustrating the connectivity of the media servers 112, 114, 116 and their respective roles in creating a distributed conference according to one embodiment. Each mixer 122, 124, 126, 128 includes a plurality of general media ports through which media (e.g., formatted according to RTP or another protocol) and control signals (e.g., mix override signals) may be communicated. An artisan will recognize from the disclosure herein that a port may provide both input and output.

As shown in the example embodiment of FIG. 2, the master mixer 122 includes general media ports labeled port 1, port 2, port 3, . . . port X through which it communicates media streams with, and provides mix override signals to, the remote tributary mixers 126, 128. The local tributary mixer 124 includes general media ports labeled port 1, port 2, . . . port W through which it communicates media streams with local users (labeled participant 1, participant 2, . . . participant W). The remote tributary mixer 126 includes general media ports labeled port 1, port 2, . . . port V through which it communicates media streams with remote users (labeled participant 1, participant 2, . . . participant V). The remote tributary mixer 128 includes general media ports labeled port 1, port 2, . . . port Y through which it communicates media streams with remote users (labeled participant 1, participant 2, . . . participant Y).

In addition, the master mixer 122, the local tributary mixer 124, and the remote tributary mixers 126, 128 also include respective common ports 210, 212, 214, 216 through which media streams and control signals (e.g., mix override signals) are received and transmitted.

The media received into each common port 210, 212, 214, 216 is also mixed into the N loudest mixed media, as described earlier and represented by Nx. Providing audio into the common port 210 of the master mixer 122 creates the ability to play announcements that can be heard by all participants of the conference, whether joined into the main (local) media server 112 or to one of the remote media servers 126, 128.

Each mixer, the master mixer 122, the local tributary mixer 124, and the remote tributary mixers 126, 128, provides an output on its common media port 210, 212, 214, 216 which includes the N loudest mixed media, as described earlier and represented by Nx.

The output on the common media port 210 from the master mixer 122 provides the ability from which conference recordings are made. The output on the common media port 210 from the master mixer 122 includes the media that all participants, local or remote, receive.

The common media port 212, 214, 216 of each remote and local tributary mixer 124, 126, 128 is connected to a particular general media port (e.g., port 1, port 2, port 3) of the master mixer 122, as described earlier and represented by a set M1 . . . Mq. As described earlier, the output of the common media ports 212, 214, 216 from the remote and local tributary mixers 124, 126, 128 include separate N loudest mixed media lines, one from each of the mixers associated with the distributed conference.

Since the master mixer 122 and the local tributary mixer 124 may be instantiated within the same physical media server 112, the media connecting these two mixers 122, 124 may be delivered internal to the main media server 112, without incurring the extra delays and processing associated with IP, UDP (user datagram protocol), and RTP (real-time transport protocol). This inter-mixer media line, or RTP bypass line 226 shown in FIG. 2, connects the common media port 212 from the local tributary mixer 124 to one of the general media ports (e.g., port 3) of the master mixer 122.

Figure 3:
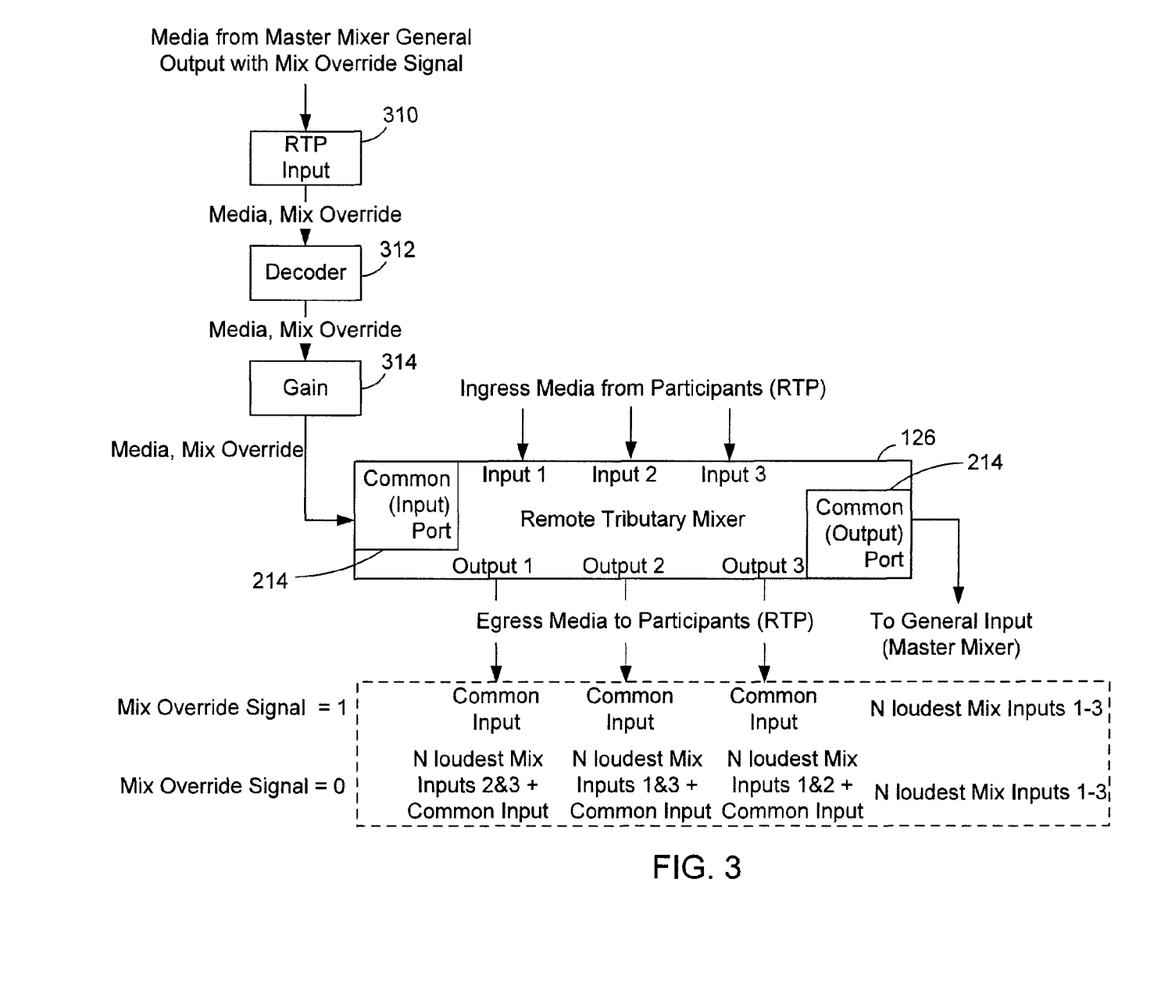
FIG. 3 is a block diagram illustrating media processing paths and associated functional blocks within a remote tributary mixer according to one embodiment.
Figure 4:
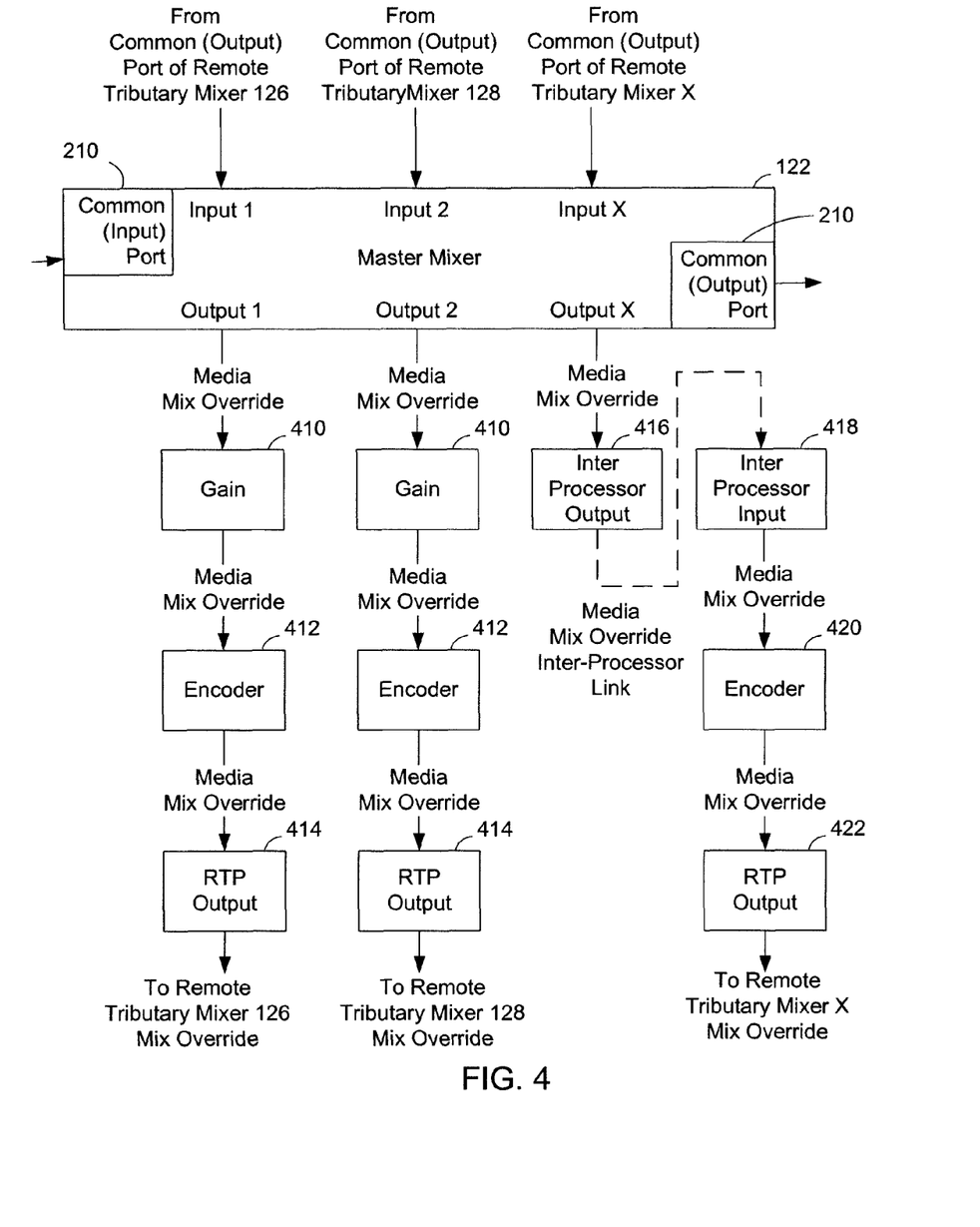
FIG. 4 is a block diagram illustrating media processing paths and associated functional blocks within the master mixer according to one embodiment.
Figure 5:
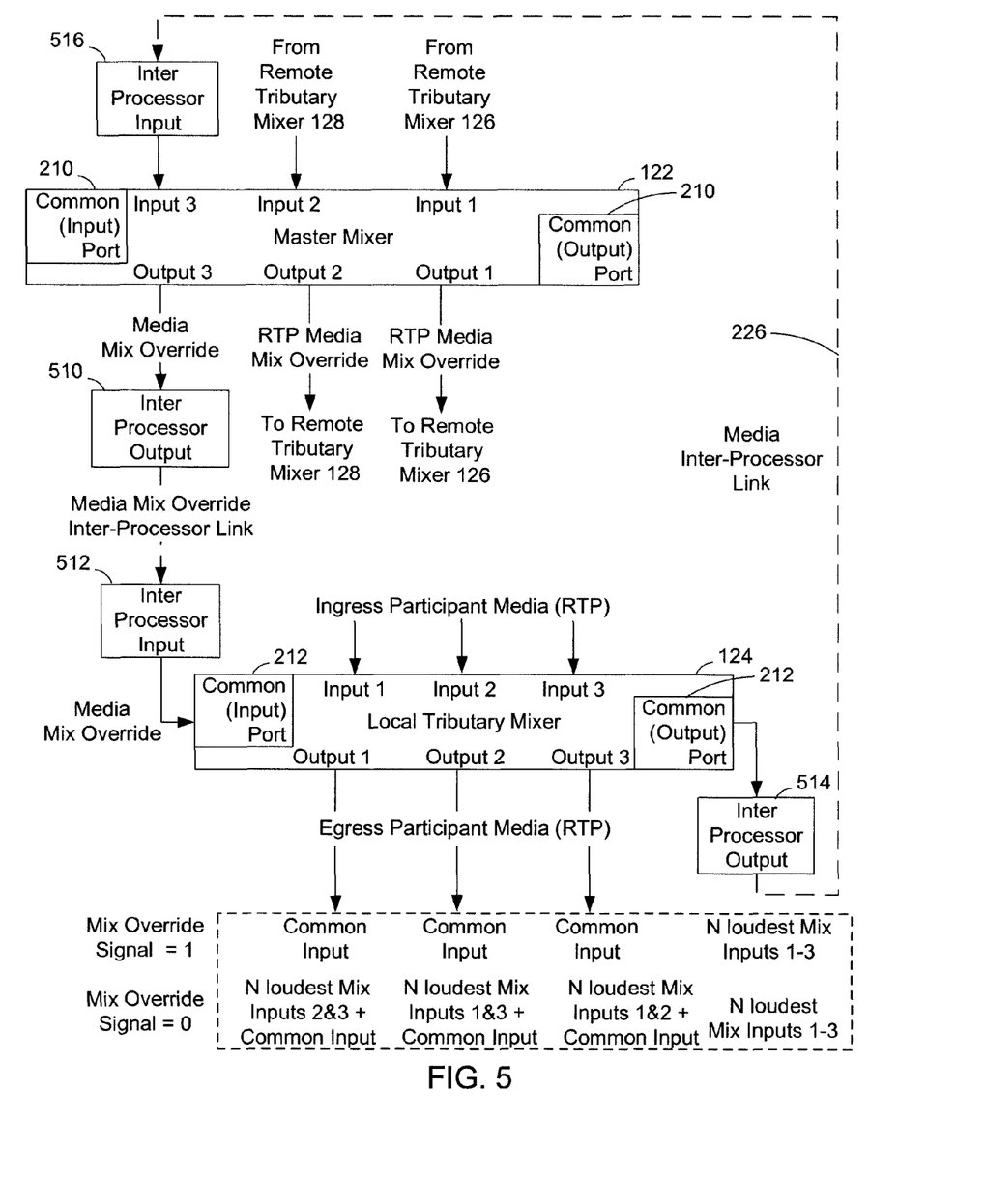
FIG. 5 is a block diagram illustrating media processing paths and associated functional blocks connecting a local tributary mixer with the master mixer, within a single media server entity, according to one embodiment.

Additional details of the connections between the master mixer 122 and the tributary mixers 124, 126, 128 are provided in FIGS. 3, 4, and 5.

Inter-mixer media lines (e.g., the media interfaces 120 shown in FIGS. 1 and 2) connecting the master mixer 122 to the remote tributary mixers 126, 128 are configured to communicate encoded, and typically compressed, media under the control of the application server 110. The media encoding scheme (for example, audio codecs such as g.711, g.729) is configured at each end of this media link, associated with media ports on the respective media servers 112, 114, 116. The media servers 112, 114, 116 provide media decoding and encoding functions at each end of the inter-mixer media link. The ingress media to each media server 112, 114, 116 is decoded to baseband (e.g., linear PCM (pulse code modulation) for audio) and encoded to the expected media encoding format on the egress side as expected by the receiving media server 112, 114, 116.

As some conference participants may only need to be listen-only participants, they do not contribute audio to the conference mix. Whether listen-only participants are joined to the local tributary mixer 124 or to any of the remote tributary mixers 126, 128, they must, according to one embodiment, receive the same media content being received by all other participants who may be contributing to the distributed conference mix.

In one embodiment, each tributary mixer 124, 126, 128, local and remote, provides a separate media port (not shown) (referred to herein as the common listen only port) to support listen-only participants as described herein. In such embodiments, the local tributary mixer 124 and remote tributary mixers 126, 128 are configured to provide a mixed stream through the common listen only port. This port includes the resulting mixed media, including any media announcements played to the master mixer 122, distributed to any number of listen-only participants joined to the local tributary mixer 124 or to any remote tributary mixer 126, 128. The common listen only port, in addition to providing the ability to fan out media to any number of listen only participants as described earlier, also provides the ability for individual mixer recording of the local tributary mixer 124 and the remote tributary mixers 126, 128.

Mixer Override Control

The inter-mixer media links 120, 226 between the master mixer 122 and the local and remote tributary mixers 124, 126, 128 provide the ability to create the distributed conference by allowing mixed media Nx from each tributary mixer 124, 126, 128 to be mixed by the master mixer 122. These inter-mixer media links 120, 226 also carry control information, herein referred to as mixer override signals, from the master mixer 122 to the local and remote tributary mixers 124, 126, 128.

The mixer override signals allow the master mixer 122 to indicate to each tributary mixer 124, 126, 128 whether or not that tributary mixer's media Nx was selected by the master mixer 122 as part of the master mixer's N loudest audio streams. If the given tributary mixer's media is included in the N loudest mix generated by the master mixer 122, then the output from the general media port 210 from the master mixer 122 connected to the common media port 212, 214, 216 of the associated tributary mixer 124, 126, 128 includes a mix override signal with a signaling bit T (see FIG. 7) set to zero, otherwise the signaling bit T in the mix override signal is set to one.

The tributary mixers 124, 126, 128 receive the respective mixer override signals embedded in the mixed media streams from the master mixer 122. The respective mixer override signals are used by the tributary mixers 124, 126, 128, received at the respective common media ports 212, 214, 216, to control the media generated as output at the respective general media ports by the tributary mixers 124, 126, 128.

In the event that a particular mixer override indicator is on (e.g., set to one as described earlier), the output of the general media ports (egress media to joined participants) from the corresponding tributary mixer 124, 126, 128, includes only the media received from the master mixer 122 through the respective common media port 212, 214, 216 of the corresponding tributary mixer 124, 126, 128. This method enables the participants joined to the corresponding tributary mixer 124, 126, 128 to hear the mix generated by the master mixer 122 and not the local mix generated by the participants joined to the corresponding tributary mixer 124, 126, 128, as in this scenario the corresponding tributary mixer's mixed media was not selected as part of the N loudest audio streams mixed by the master mixer 122. The embodiments described herein, ensure that the media received by the participants of the corresponding tributary mixer 124, 126, 128 is the same as that received by all other participants of the entire distributed conference.

In the event that the mixer override indicator is off (e.g., set to zero as described earlier), the output of the general media ports (egress media to joined participants) from the corresponding tributary mixer 124, 126, 128, include the N loudest media mix (Nx or Nx-Mk), as described earlier, and mixed with the input on the common media port 212, 214, 216 received by the corresponding tributary mixer 124, 126, 128 (which includes the mixed media from the master mixer 122).

In one embodiment, the mixer override signal is provided on a continuous real-time basis and is sent as frequently as the packetization interval configured for the inter-mixer media links between the master mixer 122 and the tributary mixers 124, 126, 128. For instance, if the inter-mixer media link is configured for g.711 audio codec with 20 ms packetization, then the current state of the mixer override signal is transmitted by the master mixer 122, along with the media in the RTP stream, once every 20 ms. In the event of lost RTP packets, the remote media servers 114, 116 continue to use the previous state of the respective mixer override signals.

By way of example, FIGS. 3, 4, and 5 graphically illustrate how the master mixer 122 uses a mix override signal to control the mixed media signals selectively provided to each participant joined to a conference through the respective tributary mixers 124, 126, 128. FIG. 3 is a block diagram illustrating media processing paths and associated functional blocks within a remote tributary mixer 126 according to one embodiment. An artisan will recognize from the disclosure herein that the discussion of FIG. 3 may apply to any of the remote tributary mixers 126, 128 shown in FIGS. 1 and 2. In FIG. 3, the general media ports (e.g., port 1, port 2, ... port V shown in FIG. 2) of the remote tributary mixer 126 are represented as input 1, input 2, and input 3 for receiving ingress media from, and output 1, output 2, and output 3 for providing egress media to, participant 1, participant 2, and participant 3, respectively. Similarly, the common port 214 of the remote tributary mixer 126 is represented as a common input and a common output.

As shown in FIG. 3, a media stream and mix override signal are received from the general media port (e.g., port 1) of the master mixer 122. The mix override signal defines when and how media is provided to the participants joined to the conference through the remote tributary mixer 126. In one embodiment, the media stream and override signal are part of an RTP media stream that has been encoded. Thus, as shown in FIG. 3, an RTP input 310 of the remote tributary mixer 126 provides the necessary RTP interface for the encoded media and mix override signal from the master mixer 122. An encoder 312 decodes the media and mix override signal, which may then be amplified by a gain module 314 for input to the common port 214 of the remote tributary mixer 126.

The remote tributary mixer 126 also receives ingress media (as RTP media streams) from participants through the general media ports (input 1, input 2, and input 3). In certain embodiments, the remote tributary mixer 126 may also receive mixed media signals from one or more other tributary mixers (not shown) through one or more of the general media ports (input 1, input 2, and input 3). For example, these other tributary mixers may be geographically distributed in a cluster where the remote tributary mixer 126 is configured as a master mixer (or sub-master mixer) for the cluster.

As shown in FIG. 3, the remote tributary mixer 126 selectively mixes the media received through the common port 214 with the media received through the general media ports (input 1, input 2, and input 3) based on the mix override signal received from the master mixer 122. For example, if the mix override signal is asserted (e.g., it is set to one), then the remote tributary mixer 126 provides only the media signal received from the master mixer 122 to the participants joined through the general media ports (e.g., output 1, output 2, and output 3) of the remote tributary mixer 126.

If, on the other hand, the mix override signal is not asserted (e.g., it is set to zero), then the remote tributary mixer 126 selectively combines the ingress media from the participants received through the general media ports (input 1, input 2, and input 3) with the media received through the common port 214 so as to prevent any particular user from receiving his or her own contribution to the conference. For example, the remote tributary mixer 126 sets: output 1 as a combination of media streams received through input 2 and input 3 (if they are part of the N loudest mix inputs) and the media stream received through the common input 214; output 2 as a combination of media streams received through input 1 and input 3 (if they are part of the N loudest mix inputs and the media stream received through the common input 214; and output 3 as a combination of media streams received through input 1 and input 2 (if they are part of the N loudest mix inputs) and the media stream received through the common input 214.

In either case, whether the mix override signal is asserted or not, the common output port 214 of the remote tributary mixer 126 provides the N loudest mix inputs (e.g., the N loudest inputs received through input 1, input 2, and/or input 3) to the corresponding general media line (e.g., port 1) of the master mixer 122.

FIG. 4 is a block diagram illustrating media processing paths and associated functional blocks within the master mixer 122 according to one embodiment. The master mixer 122 bridges the media to and from the remote tributary mixers 126, 128 and a remote tributary mixer X (not shown), provides mixing of the media received from the remote tributary mixers 126, 128, X, and sends mixer override signals to each of the remote tributary mixers 126, 128, X. In FIG. 4, the general media ports (e.g., port 1, port 2, ... port X) of the master mixer 122 shown in FIG. 2 are respectively represented as input 1/output 1 for communicating with the common port of the remote tributary mixer 126, input 2/output 2 for communicating with the common port of the remote tributary mixer 128, and input X/output X for communicating with the common port of the remote tributary mixer X.

Based on the media provided to input 1, input 2, and input 3 of the master mixer's general media ports, the master mixer 122 provides selectively mixed media streams and mix override signals to output 1, output 2, and output X of its general media ports. As discussed above, the mix media override signals are based on a selection of the N loudest media streams received from the remote tributary mixers 126, 128, X. The media streams and mix override signals provided on output 1 and output 2 of the master mixer's general media ports are each processed by a gain module 410, an encoder 412, and an RTP output module 414 (which provides the necessary RTP formatting for communication over the IP network). In this example, however, these processor resources (e.g., the gain module 410, the encoder 412, and the RTP output module 414) may not be sufficient to process all of the media streams. Thus, some media streams, such as the media stream provided through output X, may need to be provided to a different processor. The media stream and mix override signal provided on output X of the master mixer 122 is processed by an inter-processor output 416, an inter-processor input 418, an encoder 420, an RTP output 422. FIG. 4 illustrates (with a dashed line) inter-processor output 416 and inter-processor input 418 passing media between processors in the same hardware unit. The inter-processor output 416 and inter-processor input 418 provide buffering of the data as it is provided from one processor to another. The encoder 420 and RTP output 422 are shown sending this media to the remote tributary mixer X.

FIG. 5 is a block diagram illustrating media processing paths and associated functional blocks connecting the local tributary mixer 124 with the master mixer 122, within a single media server entity (e.g., the main media server 112), according to one embodiment. As such, the media path and the exchange of the mixer override signal is optimized by internally directing the media stream instead of relying on RTP.

As shown in FIG. 5, the master mixer 122 provides a media stream and a mix override signal through output 3 to an inter-processor output module 510 of the master mixer 122. The inter-processor output module 510 provides (e.g., through buffering) the media stream and mix override signal to an inter-processor input module 512 of the local tributary mixer 124 through an inter-processor link 226 (e.g., the RTP bypass line 226 shown in FIG. 2), since this media is not being sent across the network. The inter-processor input module 512 provides the media stream and mix override signal to common port 212 of the local tributary mixer 124.

After mixing the media signals based on the mix override signal, as discussed above, the local tributary mixer 124 provides the mixed media stream as an output to its common port 212, which in turn provides the mixed media signal to an inter-processor output module 514 of the local tributary mixer 124. The inter-processor output module 514 of the local tributary mixer 124 transmits the mixed media signal to an inter-processor input module 516 of the master mixer 122 through the media processor link 226. Thus, delays associated with using RTP are avoided.

In one embodiment, the mixer override signal is embedded within the RTP packets using an RTP extension header. For example, FIG. 6 is a block diagram illustrating an RTP packet format 600 and a location of a header extension 610 designated to pass mixer override control information from the master mixer 122 to each of the tributary mixers 124, 126, 128 according to one embodiment.

The RTP header extension 610 includes a profile specific identifier 612, an extension length field 614, and a header extension payload field 616. The profile specific identifier 612 is set uniquely for the embodiments described herein for distributed conferences. For this unique profile specific identifier 612, the extension length field 614 and extension payload field 616 are used for the purpose of carrying the mixer override signal. An artisan will recognize that the remaining fields and contents of the RTP packet 600 include standard RTP data, including a standard RTP header 618 and a location for the RTP payload 620.

Figure 6:
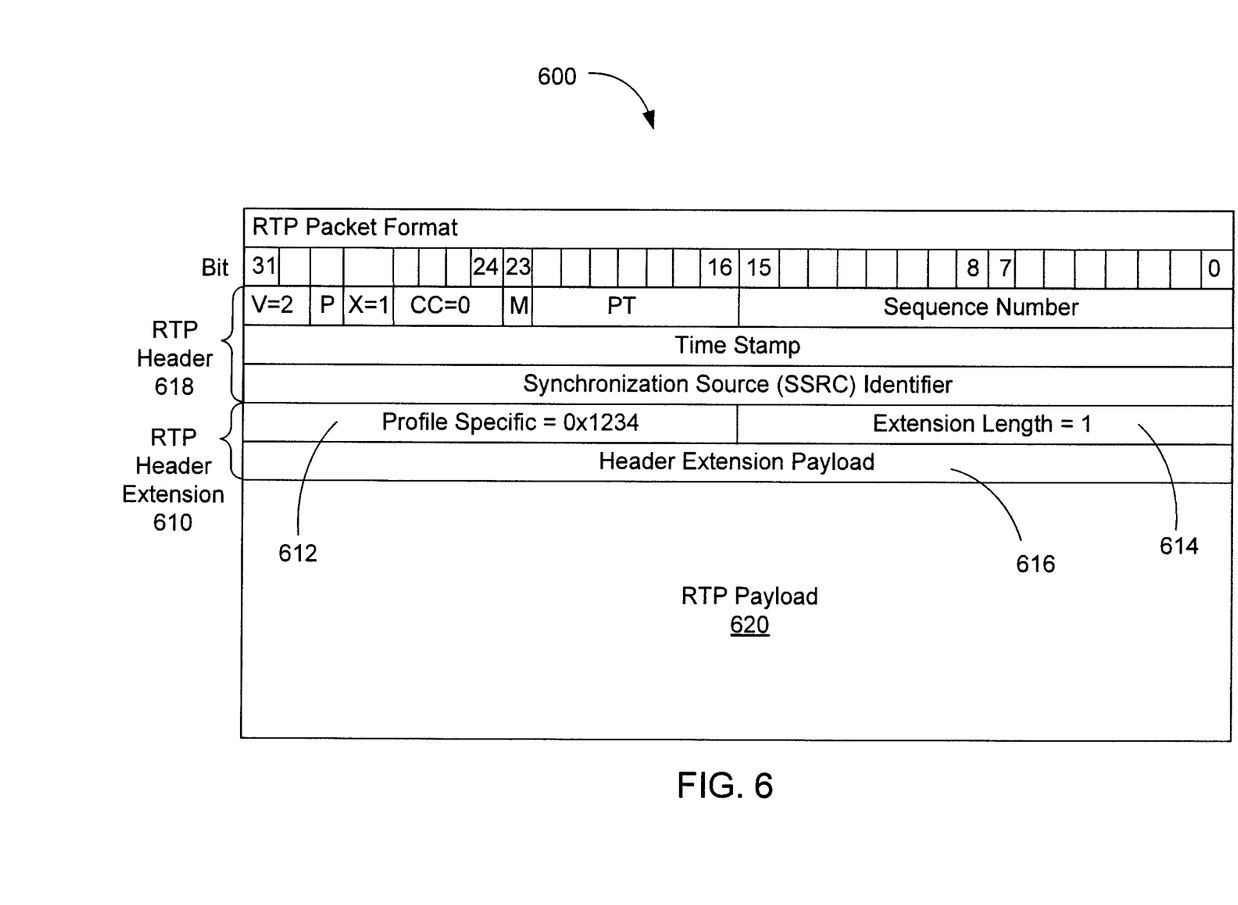
FIG. 6 is a block diagram illustrating an RTP packet format and a location of a header extension designated to pass mixer override control from the master mixer to each of the tributary mixers according to one embodiment.
Figure 7:
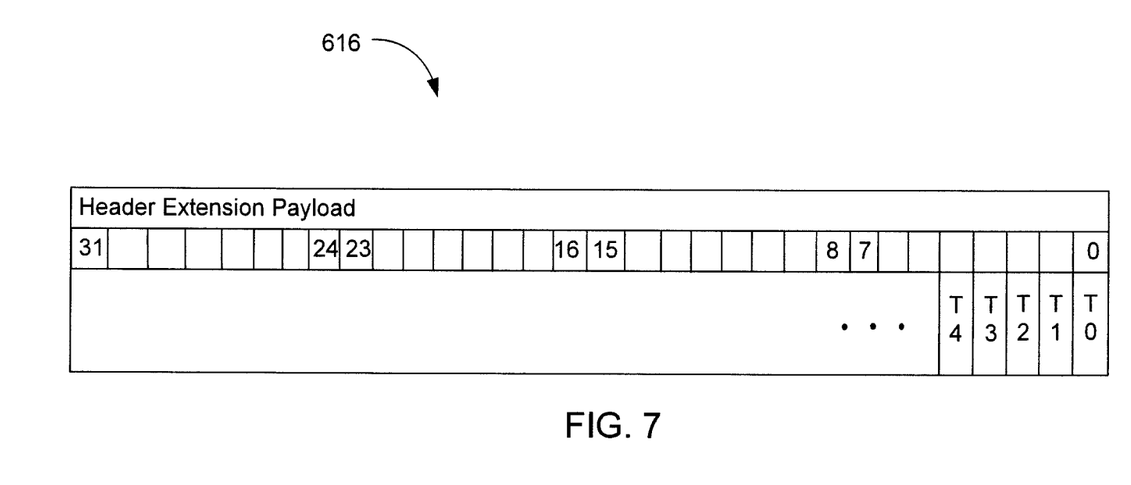
FIG. 7 is a block diagram illustrating the header extension payload shown in FIG. 6, which includes the content of the mixer override payload sent to the tributary mixers from the master mixer according to one embodiment.

FIG. 7 is a block diagram illustrating the content of the header extension payload 616 shown in FIG. 6, which includes the mixer override payload sent to the tributary mixers 124, 126, 128 from the master mixer 122 according to one embodiment. The mixer override signal is included in the header extension payload field 616 as described earlier, and includes a bit (T) array which is encoded to include both the value of mixer override signal (enabled, represented by 1 and disabled, represented by 0) and the media frame number within the packet to which the mixer override signal is applicable, where the frame number is identified by the position of mixer override bit T within the header extension payload 616. For instance, the least significant bit set to 1 would represent the mixer override signal applicable to the first 5 ms of audio for G.711 codec (with 5 ms packetization) or the first 20 ms audio for AMR codec (with 20 ms packetization). Similarly, the second least significant bit set to 1 would represent mixer override signal applicable to the second 5 ms of audio for G.711 codec (with 5 ms packetization) or the second 20 ms audio for AMR codec (with 20 ms packetization).

Media Packet Processing and Delay Optimization

Figure 8:
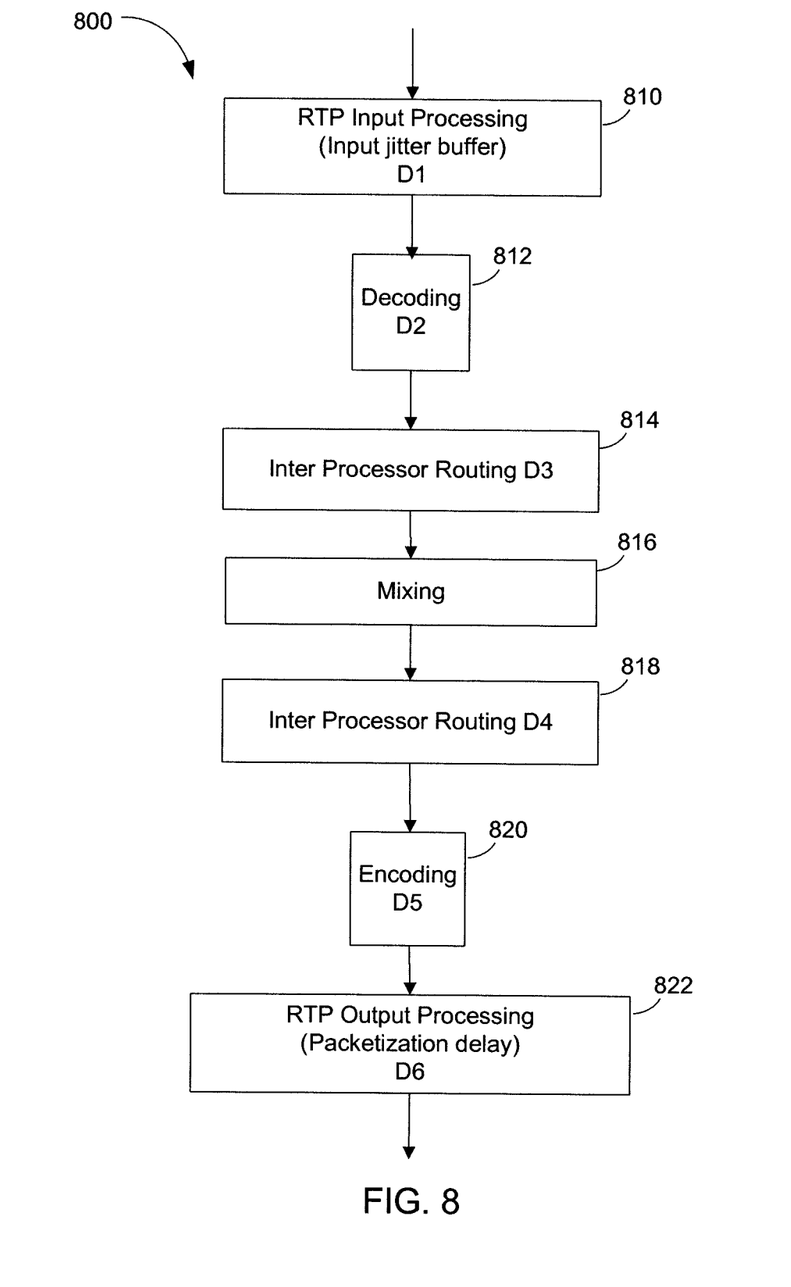
FIG. 8 is a block diagram illustrating the flow of media processing and associated end to end delays within the media server, from ingress media to egress media, according to one embodiment.

FIG. 8 is a block diagram illustrating the flow 800 of media processing and associated end to end delays within a media server 112, 114, 116, from ingress media to egress media, according to one embodiment. In short, the media processing within a mixer 124, 126, 128, from ingress RTP streams to a particular egress RTP stream, includes: (D1) RTP input processing and dejitterring 810; (D2) media decoding 812; (D3) pre-mix inter-processor routing 814; media mixing 816; (D4) post-mix inter-processor routing 818; (D5) media encoding 820; and (D6) RTP output and packetization delay processing 822. Here, Dx represents the associated media processing delay.

Figure 9:
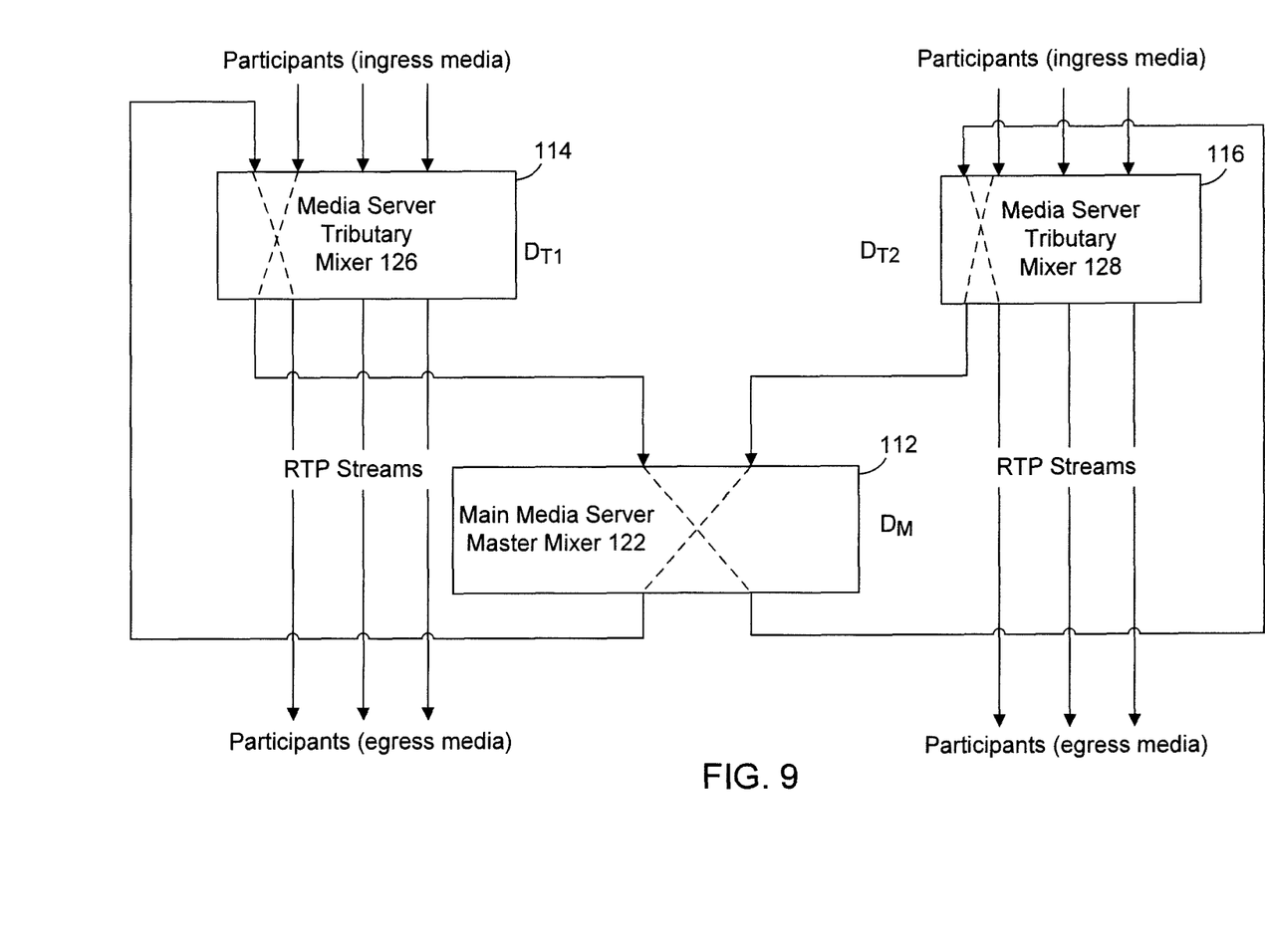
FIG. 9 is a block diagram illustrating system level delays through the master mixer and the associated remote tributary mixers according to one embodiment.

FIG. 9 is a block diagram illustrating system level delays through the master mixer 122 and the associated remote tributary mixers 126, 128 according to one embodiment. The sum of all media delays incurred in a distributed conference are larger, than by a non-distributed conference, and are minimized for optimal performance and end user experience. The media delays incurred by a distributed conference can be represented by $D_{T1}+D_M+D_{T2}$, where $D_{T1}$ is the delay contributed by the main media server 112, $D_M$ is the delay contributed by the remote media server 114, and $D_{T2}$ is the delay contributed by the remote media server 116.

Referring to FIGS. 8 and 9, the RTP input processing delay (D1) is minimized by using an automatic jitter buffer which implements a real-time method to measure the jitter based on the arrival time on ingress packets and to set the jitter buffer delay as small as possible for proper RTP reception.

The RTP input processing delay (D1) is further minimized by reducing the media packetization size which also permits the jitter buffer delay to be reduced, hence reducing the processing delay.

The media decoding and media encoding operations 812, 820 can incur significant delays (D2 and D5) if highly compressed media codecs (for example, AMR, G.723.1) are used for the inter-mixer media links. In order to minimize delays continued by the decoding and encoding 812, 820 operations for the inter-mixer media links, preference is give to use of G.711 or G.729, however, the embodiments herein do not necessarily limit the design to any specific media codec.

In a multiprocessor implementation of a media server, used to create distributed conferences as described in these embodiments, the inter processor delays, as itemized earlier by (D3) and (D4), are minimized when the media ports and mixer are instantiated on the same processor within the same physical media server. However, due to resource allocation constraints and large conference sizes, the ingress and egress port media and the mixer may be instantiated on different processors, incurring extra processing delays. In order to avoid this extra processing delay the resource management and allocation algorithm maximizes the collocation of ingress and egress port media and the mixer on the same processor, hence no inter-processor delay is incurred.

The RTP output and packetization delay (D6) is minimized by reducing the packetization size of the egress RTP packets. Utilization of 5 ms packetization provides minimum delay for media codecs that use a 5 ms frame size.

When the local tributary mixer 124 and the master mixer 122 are collocated on the same physical media server 112, the delays incurred by inter-mixer media links, connecting these associated mixers, are minimized by bypassing RTP and Codec processing. Using the embodiment of RTP bypass for inter-mixer media links, for mixers which reside on the same media server 112, eliminates the RTP input processing and dejitter delay (D1), media decoding delay (D2), media encoding delay (D3), and RTP output processing and packetization delay (D6). Utilizing the embodiment as stated herein, the delays ($D_M$) through the main media server 112, hosting the master mixer 122 and the local tributary mixer 124, are reduced to $D_M = D_3 + D_4$.

The embodiment of RTP bypass, which is applied for inter-mixer media links, when the master mixer 122 and the local tributary mixer 124 reside on the same physical media server 112, is also enabled to be under the control of the conference application server 110. The option to apply the RTP bypass can be automatically enabled by the main media server 112 or explicitly applied by the application server 110 using control signaling interface, as described in earlier sections.

It will be understood by those having skill in the art that many changes may be made to the details of the above-described embodiments without departing from the underlying principles of the invention. The scope of the present invention should, therefore, be determined only by the following claims.

The invention claimed is:

1. A system for providing a distributed conferencing service through an internet protocol (IP) network, the system comprising:
 a master mixer configured to provide distributed mixing of media streams associated with a distributed conference held through the IP network; and
 a plurality of tributary mixers configured to communicate with the master mixer, at least one of the tributary mixers configured to communicate with the master mixer through the IP network, each tributary mixer configured to:
  join one or more respective participants to the distributed conference;
  generate a first mixed media stream by mixing a plurality of ingress media streams from the respective participants;
  communicate the first mixed media stream to the master mixer;
  receive a second mixed media stream from the master mixer, the second mixed media stream comprising media from at least one other participant joined to the distributed conference through another of the tributary mixers, wherein the master mixer determines whether or not to also include the first mixed media stream in the second mixed media stream; and
  provide egress media streams to its respective participants, each egress media stream comprising the second mixed media stream,
  wherein for each egress media stream, the tributary mixer selectively mixes the second mixed media stream with at least a portion of the first mixed media stream, based on a mixer override signal from the master mixer indicating that the first mixed media stream is included in the second mixed media stream.

2. The system of claim 1, further comprising:
 a first IP media server comprising the master mixer; and
 a second IP media server comprising a first of the tributary mixers, wherein the second IP media server is geographically remote from the first IP media server, and wherein the second IP media server is configured to communicate with the first IP media server through the IP network.

3. The system of claim 2, wherein the first IP media server further comprises a second of the tributary mixers, wherein the first of the tributary mixers is configured to join remote participants to the distributed conference, and wherein the second of the tributary mixers is configured to join local participants to the distributed conference.

4. The system of claim 3, wherein each of the remote participants and each of the local participants receives the same audio media content through the respective egress media streams, except for any audio media content contributed to the distributed conference by the particular participant.

5. The system of claim 2, further comprising a conferencing application server configured to communicate with the first IP media server and the second IP media server through the IP network using a signaling control interface, the conferencing application server configured to:
 join and manage the plurality of tributary mixers to the master mixer during the distributed conference; and
 join and manage the participants to the respective mixers during the distributed conference.

6. The system of claim 5, wherein the signaling control interface comprises a session initiation protocol (SIP) carrying extensible markup language (XML) from the conferencing application server to the first IP media server and the second IP media server through the IP network.

7. The system of claim 5, wherein, for each tributary mixer, generating the first mixed media stream comprises independently mixing a predetermined number of the ingress media streams from the respective participants, wherein the predetermined number is under configuration control of the conferencing application server.

8. The system of claim 1, wherein the master mixer is configured to:
 receive a single one of the first mixed media streams from each of the plurality of tributary mixers, at least one of the first mixed media streams being communicated through the IP network; and
 for each of the plurality of tributary mixers:
  generate the second mixed media stream corresponding to the particular tributary mixer by selectively mixing the plurality of first mixed media streams received from the other tributary mixers;
  determine whether the first mixed media stream received from the particular tributary mixer is included in the distributed conference;
  based on the determination, generate a mixer override signal; and
  transmit the second mixed media stream and the corresponding mixer override signal to the particular tributary mixer.

9. The system of claim 8, wherein transmitting the second mixed media stream and the corresponding mixer override signal to the particular tributary mixer comprises transmitting the corresponding mixer override signal in real-time and along with each media frame of the second mixed media stream.

10. The system of claim 1, wherein the plurality of tributary mixers are geographically distributed in clusters, and wherein the system further comprises an additional master mixer for each cluster, each master mixer configured to communicate with the master mixer through the IP network.

11. The system of claim 1, wherein the master mixer comprises a common port configured to provide conference announcements and recording services, wherein all of the participants in the distributed conference hear the conference announcements injected into the common port, and wherein the recording services provided through the common port comprise a recording of the media as received by all of the participants in the distributed conference.

12. The system of claim 1, wherein the master mixer and each of the plurality of tributary mixers independently provide media transcoding.

13. The system of claim 1, wherein communication between the master mixer and the plurality of tributary mixers uses real-time transport protocol (RTP) over IP.

14. The system of claim 13, wherein using RTP over IP comprises transmitting RTP packets from the master mixer to the plurality of tributary mixers, each RTP packet including an RTP extension header indicating whether the first mixed media stream is included in the distributed conference.

15. A method for providing a distributed conferencing service through an internet protocol (IP) network using an aggregate collection of IP media servers, the system comprising:

joining a plurality of participants to a distributed conference through a tributary mixer, the tributary mixer in communication with a master mixer through the IP network;

generating a first mixed media stream by mixing a plurality of ingress media streams from the participants joined through the tributary mixer;

communicating the first mixed media stream to the master mixer;

receiving a second mixed media stream from the master mixer, the second mixed media stream comprising media selected to be included in the distributed conference, wherein the master mixer determines whether or not to include the first mixed media stream in the second mixed media stream; and providing egress media streams to the participants joined through the tributary mixer, each egress media stream comprising the second mixed media stream, wherein, for each egress media stream, the tributary mixer selectively mixes the second mixed media stream with at least a portion of the first mixed media stream, based on a mixer override signal from the master mixer indicating that the first mixed media stream is included in the second mixed media stream.

16. The method of claim 15, further comprising transmitting the first mixed media stream from the tributary mixer to the master mixer through the IP network.

17. The method of claim 15, further comprising increasing the number of participants in the distributed conference by joining additional participants through another tributary mixer in communication with the master mixer.

18. The method of claim 17, wherein the second mixed media stream comprises media content provided by one or more of the additional participants.

19. The method of claim 15, further comprising configuring the tributary mixer and establishing communication between the tributary mixer and the master mixer through a conferencing application server.

20. The method of claim 19, wherein generating the first mixed media stream comprises mixing a predetermined number of the ingress media streams from the respective participants, wherein the predetermined number is under configuration control of the conferencing application server.

21. A method for providing a distributed conferencing service through an internet protocol (IP) network using an aggregate collection of IP media servers, the system comprising:

receiving, at a master mixer, a single first mixed media stream from each of a plurality of tributary mixers, at least one of the first mixed media streams being communicated through the IP network; and for each of the plurality of tributary mixers:

generating, at the master mixer, a second mixed media stream corresponding to the particular tributary mixer by selectively mixing the plurality of first mixed media streams received from the other tributary mixers;

determining whether the first mixed media stream received from the particular tributary mixer is included in the distributed conference;

based on the determination, generating a mixer override signal; and transmitting the second mixed media stream and the corresponding mixer override signal from the master mixer to the particular tributary mixer, wherein the particular tributary mixer selectively mixes the second mixed media stream with at least a portion of the first mixed media stream, based on the mixer override signal.

22. The method of claim 21, wherein transmitting the second mixed media stream and the corresponding mixer override signal to the particular tributary mixer comprises transmitting the corresponding mixer override signal in real-time and along with each media frame of the second mixed media stream.

* * * * *